(12) United States Patent
Younessian

(10) Patent No.: US 12,494,218 B2
(45) Date of Patent: *Dec. 9, 2025

(54) METHODS AND SYSTEMS FOR AUGMENTING AUDIO CONTENT

(71) Applicant: Comcast Cable Communications, LLC, Philadelphia, PA (US)

(72) Inventor: Ehsan Younessian, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,666

(22) Filed: Jun. 30, 2023

(65) Prior Publication Data

US 2024/0005943 A1    Jan. 4, 2024

Related U.S. Application Data

(63) Continuation of application No. 17/896,785, filed on Aug. 26, 2022, now Pat. No. 11,735,203, which is a continuation of application No. 17/082,866, filed on Oct. 28, 2020, now Pat. No. 11,456,004.

(51) Int. Cl.
| | |
|---|---|
| *G10L 21/0324* | (2013.01) |
| *G06V 10/40* | (2022.01) |
| *G06V 20/00* | (2022.01) |
| *G06V 30/19* | (2022.01) |
| *G10L 25/51* | (2013.01) |
| *H04N 21/439* | (2011.01) |

(52) U.S. Cl.
CPC .......... *G10L 21/0324* (2013.01); *G06V 10/40* (2022.01); *G06V 20/00* (2022.01); *G06V 30/19173* (2022.01); *G10L 25/51* (2013.01); *H04N 21/4394* (2013.01)

(58) Field of Classification Search
CPC ..... G10L 21/0324; G10L 25/51; G06V 10/40; G06V 20/00; G06V 30/19173; H04N 21/4394
See application file for complete search history.

(56) References Cited

U.S. PATENT DOCUMENTS

| | | | | |
|---|---|---|---|---|
| 9,774,911 | B1* | 9/2017 | Thomas | G10L 25/51 |
| 9,888,279 | B2* | 2/2018 | Ishtiaq | H04N 21/2353 |
| 10,455,297 | B1* | 10/2019 | Mahyar | H04N 21/4532 |
| 10,726,842 | B2* | 7/2020 | Lambourne | G10L 15/26 |
| 10,999,566 | B1* | 5/2021 | Mahyar | G06F 40/166 |
| 11,861,262 | B2* | 1/2024 | Hornsby | H04N 5/272 |
| 2011/0097058 | A1* | 4/2011 | Fan Jiang | G11B 27/309 |
| | | | | 386/E5.001 |

(Continued)

OTHER PUBLICATIONS

U.S. Appl. No. 17/896,785 (2022/0415339), filed Aug. 26, 2022 (Dec. 29, 2022), Ehsan Younessian (Comcast Cable Communications, LLC).

(Continued)

*Primary Examiner* — Olisa Anwah
(74) *Attorney, Agent, or Firm* — Ballard Spahr LLP

(57) ABSTRACT

The audio content (e.g., an audio track, an audio file, an audio signal, etc.) of a content item (e.g., multimedia content, a movie, streaming content, etc.) may be modified to augment and/or include one or more auditory events, such as a sound, a plurality of sounds, a sound effect(s), a voice(s), and/or music.

34 Claims, 6 Drawing Sheets

(56) References Cited

U.S. PATENT DOCUMENTS

| | | | | |
|---|---|---|---|---|
| 2011/0314485 | A1* | 12/2011 | Abed | H04N 21/4348 |
| | | | | 348/E7.001 |
| 2014/0184905 | A1* | 7/2014 | Mountain | H04N 21/42204 |
| | | | | 348/468 |
| 2016/0381399 | A1* | 12/2016 | Brondijk | H04N 21/8106 |
| | | | | 725/116 |
| 2018/0210697 | A1 | 7/2018 | Rakshit | |
| 2019/0306563 | A1* | 10/2019 | Chen | H04N 21/442 |
| 2019/0325067 | A1* | 10/2019 | Vaughn | G06N 20/00 |
| 2019/0392852 | A1* | 12/2019 | Hijazi | G06N 3/084 |
| 2020/0076988 | A1* | 3/2020 | Aides | G06F 18/2413 |
| 2020/0107079 | A1* | 4/2020 | Sun | H04N 21/4722 |
| 2020/0366968 | A1* | 11/2020 | Calkins | H04R 25/353 |
| 2021/0151082 | A1* | 5/2021 | Wang | H04N 21/84 |
| 2021/0368222 | A1* | 11/2021 | Stelmar Netto | G11B 27/031 |
| 2023/0300399 | A1* | 9/2023 | Stone | H04N 21/440236 |
| | | | | 348/564 |

OTHER PUBLICATIONS

U.S. Appl. No. 17/082,866 (U.S. Pat. No. 11,456,004), filed Oct. 28, 2020 (Sep. 27, 2022), Ehsan Younessian (Comcast Cable Communications, LLC).

\* cited by examiner

| Animals | Natural soundscapes & water sounds | Human, non-speech sounds | Interior/domestic sounds | Exterior/urban noises |
|---|---|---|---|---|
| Dog | Rain | Crying baby | Door knock | Helicopter |
| Rooster | Sea waves | Sneezing | Mouse click | Chainsaw |
| Pig | Crackling fire | Clapping | Keyboard typing | Siren |
| Cow | Crickets | Breathing | Door, wood creaks | Car horn |
| Frog | Chirping birds | Coughing | Can opening | Engine |
| Cat | Water drops | Footsteps | Washing machine | Train |
| Hen | Wind | Laughing | Vacuum cleaner | Church bells |
| Insects (flying) | Pouring water | Brushing teeth | Clock alarm | Airplane |
| Sheep | Toilet flush | Snoring | Clock tick | Fireworks |
| Crow | Thunderstorm | Drinking, sipping | Glass breaking | Handsaw |

FIG. 2

| Timecode | Visual Element / Textual Element | Audio Labels | Correlation Values | Correlation Threshold Value | Auditory Event |
|---|---|---|---|---|---|
| 5 seconds | Police Car; Siren | Siren | 1; 1 | .5 | yes |
| 3780 seconds | Fire | Fire | 1 | .5 | yes |
| 4800 seconds | Radio; Car | Ocean | .4; .3 | .5 | no |

FIG. 3

METHODS AND SYSTEMS FOR AUGMENTING AUDIO CONTENT

CROSS REFERENCE TO RELATED PATENT APPLICATION

This application claims priority under 35 U.S.C. § 120 to, and is a continuation of, U.S. Non-Provisional application Ser. No. 17/896,785, filed Aug. 26, 2022, and which claims priority under 35 U.S.C. § 120 to, and is a continuation of, U.S. Non-Provisional application Ser. No. 17/082,866, filed Oct. 28, 2020, now U.S. Pat. No. 11,456,004, issued Sep. 27, 2022, the entire contents of which are hereby incorporated by reference for all purposes.

BACKGROUND

Content items (e.g., multimedia content, a movie, streaming content, etc.), such as movies or television shows, may include audio that provides context to, and/or aids the subjective understanding of, the content item. For example, a content item may include audio content (e.g., audio data, an audio track, etc.) that includes sounds, sound effects, speech/dialogue, and/or the like that, correspond to, explain, provide context to, and/or complement visually depicted scenes, events, and/or the like of the content item. Portions of the audio (e.g., auditory events, etc.), such as sounds, sound effects, speech/dialogue, and/or the like that, that provide context to specific scenes and/or events depicted by the content item, may be too loud, too low, and/or missing altogether. Audio content with portions that are too loud, too low, and/or missing negatively impacts the user experience. Particularly, the subjective perception and/or understanding of the context of the content item may be impacted. The impact is exacerbated for people that may be visually impaired and unable to rely on the visually depicted scenes/events and/or supplementary information associated with media content items such as subtitles, closed captioning, an audio description, and/or additional dialogue (e.g., dialogue in a different language, etc.), and instead rely on the audio content for context and/or understanding when consuming (e.g., listening, etc.) the content item.

SUMMARY

It is to be understood that both the following general description and the following detailed description are exemplary and explanatory only and are not restrictive. Methods and systems for augmenting audio are described.

A content item (e.g., multimedia content, a movie, streaming content, etc.) may include audio content (e.g., sounds, sound effects, speech/dialogue, etc.) that corresponds to different portions (e.g., scenes, frames, etc.) of the content item. The audio content may include one or more sounds, audible instances, voices, contextual audio occurrences, and/or the like, such as one or more auditory events, that provide context to specific scenes and/or events depicted by the content item and/or aid subjective perception (e.g., what is seen, heard, interpreted, etc.) of the content item. An auditory event may include a sound, a plurality of sounds, a sound effect, a voice, music, and/or the like. Any sound included with the audio content may be an auditory event. For example, the content item may depict a boat on the ocean (an ocean scene) and the audio content may include sounds of the boat moving (e.g., engine noises, horns, etc.). The audio content may include an auditory event (one or more auditory events) that provides context to the ocean scene, such as a sound of ocean waves, and/or the like, that is unperceivably low (attenuated). The audio content may be modified to augment/enhance the one or more auditory events and/or include additional auditory events (e.g., additional sounds that aid/enhance perception of the content item). For example, visual content (e.g., depicted scenes, depicted events, etc.) and/or textual content (e.g., audio descriptive data, closed captioning, etc.) of the content item may be analyzed to determine candidate auditory events for one or more portions (e.g., scenes, frames, etc.) of the content item. The candidate auditory events may be compared to the audio content to determine one or more portions of the content item that should include auditory events, and/or one or more portions of the content item that include auditory events that should be modified, such as auditory events that are attenuated, accentuated, and/or unintelligible. Returning to the example, the visual content and/or the textual content of the content item may be used to determine that the ocean scene should be associated with the sound of ocean waves and/or the like, and if the audio content does not include the sound (or the sound is low/inaudible), the sound of ocean waves and/or the like may be added (or enhanced).

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems:

FIG. 2 shows an example table of example auditory events;

FIG. 3 shows an example table for augmenting audio content;

DETAILED DESCRIPTION

Figure 1:
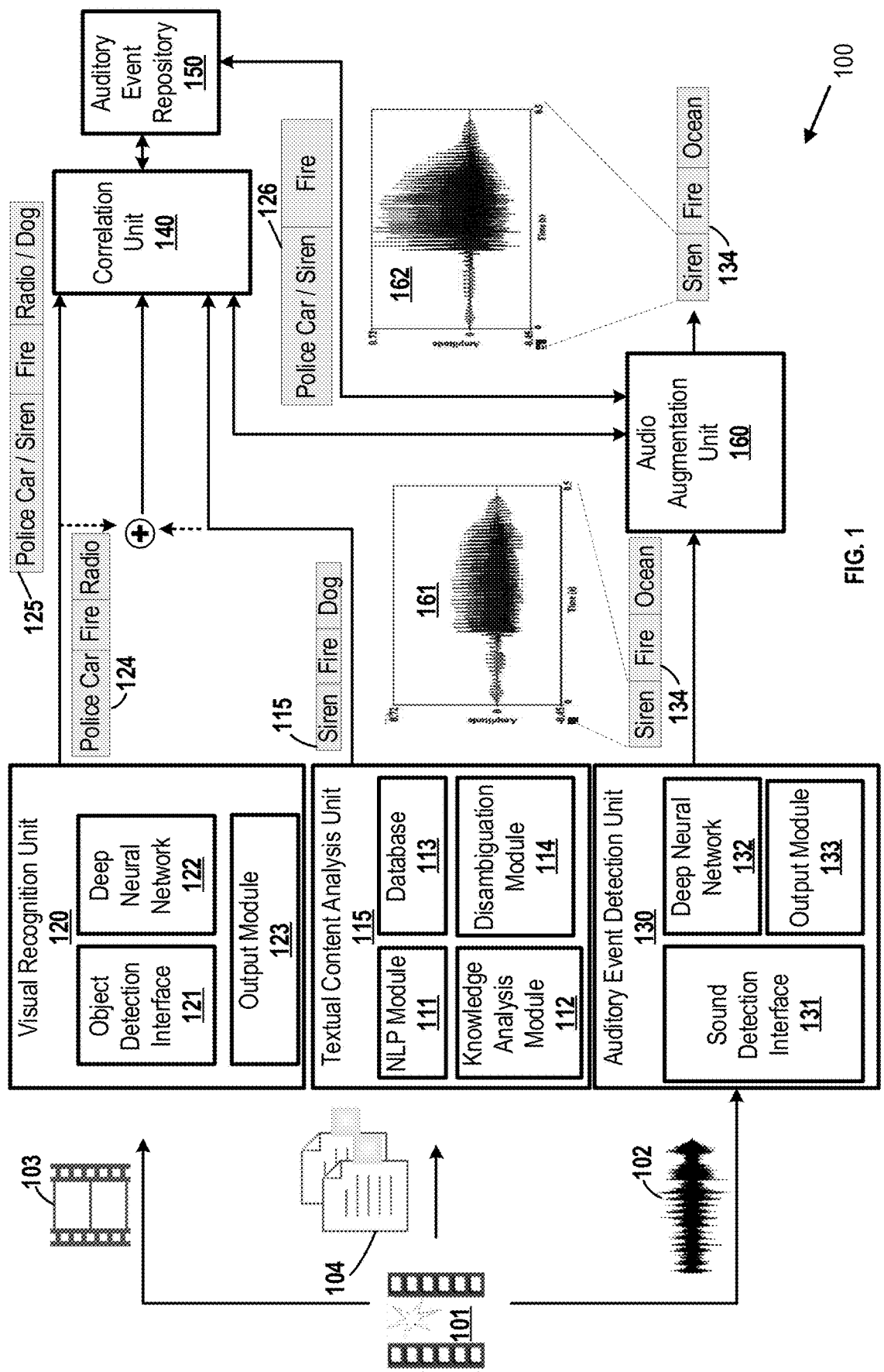
FIG. 1 shows an example system for augmenting audio content.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text, and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

A content item (e.g., multimedia content, a movie, streaming content, etc.) may include audio content (e.g., sounds, sound effects, speech/dialogue, etc.) that corresponds to different portions (e.g., scenes, frames, etc.) of the content item. The audio content may include one or more auditory events that provide context to specific scenes and/or events depicted by the content item and/or aid subjective perception (e.g., what is seen, heard, interpreted, etc.) of the content item. An auditory event may include a sound, a plurality of sounds, a sound effect, a voice, music, and/or the like.

In an embodiment, one or more of audio data, visual content, or textual content may be analyzed to determine whether an auditory event of the content item is too loud, too low, and/or missing. The one or more of the audio data, the visual content, or the textual content may be used to identify one or more candidate audio events in an audio event repository that may be used to supplement the content item, for example, by inserting an audio event to supplement for a missing audio event or by replacing an existing audio event with an audio event that is more relevant to the content item or to that is louder or quieter than the existing audio event.

In an embodiment, an audio file associated with the content item may comprise one or more audio data headers containing audio data that indicates auditory events (e.g., specific sounds, etc.) for the one or more portions of the content item. Any sound included with the audio content may be an auditory event. For example, the content item may depict a boat on the ocean (an ocean scene) and the audio content may include sounds of the boat moving (e.g., engine noises, horns, etc.). The audio content may include an auditory event (one or more auditory events) that provides context to the ocean scene, such as a sound of ocean waves, and/or the like, that is unperceivably low (attenuated). The audio content may be modified to augment/enhance the one or more auditory events and/or include additional auditory events. For example, video content and/or textual content included with and/or associated with the content item may be used to determine one or more media elements (e.g., visual elements, textual elements, etc.) of the content item. The one or more media elements may include indications/descriptions (e.g., labels, etc.) of objects, actions, scenes, events, and/or the like occurring within the content item. The one or more media elements may be used to modify/augment the audio content.

In an embodiment, visual content (e.g., depicted scenes, depicted events, etc.) of the content item may be analyzed to determine one or more portions (e.g., scenes, frames, etc.) of the content item that should include auditory events (e.g., specific sounds, etc.). The visual content may include a plurality of timecoded portions that each correspond to a timecoded portion of a plurality of timecoded portions of the content item. Visual recognition/analysis (e.g., object/identity recognition, motion detection, location identification, etc.) and/or the like may be performed on each portion (e.g., frame, etc.) of the visual content to determine a distribution of visual elements associated with the plurality of portions of the visual content, such as one or more visual elements that include indications/descriptions (e.g., labels, etc.) of objects, actions, scenes, events, and/or the like occurring within and/or associated with the content item.

In an embodiment, textual content (e.g., audio descriptive data, closed captioning, etc.) of the content item may be analyzed to determine one or more portions (e.g., scenes, frames, etc.) of the content item that should include auditory events (e.g., specific sounds, etc.). The textual content may include a plurality of timecoded portions that each correspond to a timecoded portion of the plurality of timecoded portions of the visual content and/or the content item. Entity analysis and/or the like may be performed on each portion of the textual content to determine a distribution of textual elements (e.g., one or more indications/descriptions/labels of objects, actions, scenes, events, etc.) associated with the plurality of portions of the textual content, such as one or more textual elements that include indications/descriptions (e.g., labels, etc.) of objects, actions, scenes, events, and/or the like occurring within and/or associated with the content item.

A distribution of media elements (e.g., one or more indications/descriptions/labels of objects, actions, scenes, events, etc.), such as the distribution of media elements associated with the plurality of portions of the visual content (e.g., a distribution of visual elements) and/or the textual content (e.g., a distribution of textual elements), may be compared to one or more auditory events described and/or included in an auditory event repository to identify one or more candidate auditory events. Elements of the distribution of visual elements associated with the visual content may be combined, based on the timecode, with elements of the distribution of textual elements associated with the textual content to form a combined distribution of media elements (e.g., a combined dataset, etc.). Elements of the combined distribution of media elements may be compared to one or more auditory events within the auditory event repository to identify candidate auditory events. Word embedding, ontology learning, syntax analysis, natural language processing, and/or the like may be used to identify media elements (e.g., indications/descriptions/labels of objects, actions, scenes, events, etc.) of a distribution of media elements that satisfy a correlation (similarity) threshold between one or more auditory events within an auditory event repository. Media elements and auditory events from the auditory event repository that satisfy the correlation (similarity) threshold may indicate that an auditory event should be associated with the corresponding portion of the content item. For example, elements and auditory events from the auditory event repository that satisfy the correlation (similarity) threshold may indicate a candidate auditory event. A candidate auditory event for the content item may be determined whenever a media element (e.g., a visual element and/or a textual element, etc.), such as a textually described sound or a visually represented sound, and an auditory event described and/or included in the auditory event repository satisfy the correlation (similarity) threshold. One or more portions of the content item that should include auditory events (candidate auditory events) may be determined based on candidate auditory events.

The candidate auditory events may be compared to the audio content, and based on the comparison, one or more auditory events (e.g., specific sounds, etc.) associated with the audio content may be augmented/enhanced to increase an audio level of the one or more auditory events.

The audio content may be modified to include one or more additional auditory events. For example, one or more media elements (e.g., visual elements determined from the visual content and/or textual elements determined from the textual content, etc.) of the content item may be used to determine that a scene at an ocean (depicted by the content item) should be associated with sounds of rolling waves, and if the audio content does not include the sound (or the sound is low/inaudible), the sound may be added (or enhanced).

FIG. 1 shows a system 100 for augmenting audio content. One skilled in the art will appreciate that provided herein is a functional description and that the respective functions may be performed by software, hardware, or a combination of software and hardware.

A content item 101 may be a multimedia content item, such as a movie or a television show, that includes different types of media. For example, the content item 101 may include audio content 102 which includes sounds, sound effects, speech/dialogue, and the like that corresponds to different portions (e.g., scenes, frames, etc.) of the content item 101. The audio content 102 may include one or more auditory events. An auditory event may include a sound, a plurality of sounds, a sound effect, a voice, music, and/or the like. The one or more auditory events may be any sounds that provide context to specific scenes and/or events depicted by and/or occurring within the different portions (e.g., scenes, frames, etc.) of the content item 101, and that aid subjective perception (e.g., what is seen, heard, interpreted, etc.) of the content item 101. The audio content 102 may be formatted as, and/or include audio/sound data, an audio file, an audio track, a raw waveform, and/or the like.

The content item 101 may include visual content 103 that corresponds to the different portions (e.g., scenes, frames, etc.) of the content item 101. The visual content 103 may depict/include images, objects, events, actions, scenes, and/or the like associated with (occurring within) the content item 101, such as what may be seen and/or viewed during playback of the content item 101. The visual content 103 may be formatted as, and/or include video and/or any type of video data/information (e.g., AVI, MOV, MPEG, MP4, AVCHD, FLV, raw video format, 3GPP, 3GPP2. MXF, NSV, etc.). In some embodiments, the content item 101 may include textual content 104 that corresponds to the different portions (e.g., scenes, frames, etc.) of the content item 101. The textual content 104 may include, for example, subtitles, closed captioning, additional dialogue (such as dialogue in a different language to dialogue used in a media content item), and/or optical character recognition (OCR) transcript data (e.g., one or more words embedded in a video frame, etc.). The textual content 104 may include audio description data, such as written versions of sounds, sound effects, speech/dialogue, and/or the like that occur during playback of the content item 101. The audio content 102, the visual content 103, and the textual content 104 may each include a plurality of corresponding timecoded portions that each correspond to a timecoded portion of the different portions (e.g., scenes, frames, etc.) of the content item 101. For example, the audio content 102, the visual content 103, and the textual content 104 may be synchronized media contents of the content item 101.

The system 100 may augment the audio content 102 to include and/or enhance the one or more auditory events. Media content of the content item 101, such as the visual content 103 and/or the textual content 104, may be used to determine modifications/augmentations of other media content of the content item 101, such as the audio content 102. To determine modifications/augmentations of the audio content 102, some or all of the media components of the content item 101 may be analyzed to determine one or more media elements indicative of and/or associated with auditory events. For example, the audio content 102 may be provided to an auditory event detection unit 130 that determines and/or identifies the one or more auditory events occurring within the audio content 102. The visual content 103 may be provided to a visual recognition unit 120 that determines one or more visual elements that include indications/descriptions (e.g., labels, etc.) of objects, actions, scenes, events, and/or the like occurring/depicted within the one or more portions (e.g., scenes, frames, etc.) of the content item 101. The textual content 104 may be provided to a textual content analysis unit 110 that determines one or more textual elements that include indications/descriptions (e.g., labels, etc.) of objects, actions, scenes, events, and/or the like occurring/depicted within the one or more portions (e.g., scenes, frames, etc.) of the content item 101. The one or more media elements may include the visual elements determined from the visual content 103 and/or the textual elements determined from the textual content 104. The visual content 103 (visual elements) and/or the textual content 104 (textual elements) may be used to determine whether the audio content 102 should be modified/augmented with one or more candidate auditory events.

Visual recognition/analysis (e.g., visual semantic indexing, visual concept discrimination analysis, object/identity recognition, motion detection, location identification, etc.) may be used to determine/identify objects, actions, scenes, events, and/or the like associated with (occurring within) the content item 101, such as what may be seen and/or viewed during playback of the content item 101. Visual recognition/analysis and/or the like may be performed by the visual recognition unit 120 on one or more portions (e.g., frame, etc.) of the visual content 103 to determine a distribution of visual elements (e.g., objects, actions, scenes, events, etc.) associated with the plurality of portions of the visual content 103. The visual recognition unit 120 may include an object detection interface 121. The object detection interface 121 may receive the visual content 103. The object detection interface 121 may extract features from the visual content 103 (or visual content associated with a different content item). Features may be extracted from the visual content 103 (or visual content associated with a different content item) at regular time intervals (e.g., based on the timecoded portions of the content item 101, etc.). The features may be indications/representations of objects, actions, scenes, events, and/or the like occurring within the visual content 103. The extracted features may be labeled with appropriate filter information (e.g., objects, actions, scenes, events, etc.) to create one or more labeled data sets. The one or more labeled data sets may be used to train a deep neural network module 122 to detect objects (e.g., a police car, etc.), actions (e.g., running, etc.), and/or scenes (e.g., an ocean, etc.) in each portion (e.g., frame, etc.) of the visual content 103.

A trained deep neural network module 122 may include a sequence of multiple subnetworks arranged from a lowest subnetwork in the sequence to a highest subnetwork in the sequence. The deep neural network module 122 may perform the same and/or similar processes on each portion (e.g., frame, etc.) of the visual content 103, through each of the subnetworks in the sequence to generate an alternative representation of the visual content 103. The subnetworks in the sequence may include multiple module/layered subnetworks and/or one or more subnetworks that each consist of one or more neural network layers, such as max-pooling layers, convolutional layers, fully-connected layers, regularization layers, and/or the like. A module/layered subnetwork may include a pass-through convolutional layer, one or more groups of neural network layers, and a concatenation layer. Each group of neural network layers in the module/layered subnetwork may include two or more neural network layers in sequence. The concatenation layer may receive an output generated by a pass-through convolutional layer and a respective output generated by each of the one or more groups of neural network layers. The concatenation layer may concatenate the received outputs to produce a single output that is provided as the output of the module/layered subnetwork. Each node in a fully-connected layer may receive an input from each node in the next lowest layer in the sequence and produces an activation from the received inputs in accordance with a set of weights for the node. The activations generated by each node of a fully-connected layer may be provided as an input to each node in the next highest fully-connected layer in the sequence and/or provided to an output module 123.

Based on the alternative representation of the visual content 103 (e.g., a concatenated output from a subnetwork, etc.) an output module 123 (e.g., an output layer, a softmax layer, a rectified linear unit (ReLU), etc.) may generate/produce an output associated with one or more portions (e.g., one or more frames, etc.) of the visual content 103, such as a distribution of visual elements (e.g., objects, actions, scenes, events, etc.) associated with the plurality of portions of the visual content 103. As an example, a distribution of visual elements 124 depicts elements (visual elements) determined for portions of the plurality of portions of the visual content 103 where a first portion is associated with an object identified as (and/or a scene determined to include) a "police car," a second portion is associated with an object identified as (and/or a scene determined to include) "fire," and a third portion is associated with an object identified as (and/or a scene determined to include) a "radio."

The textual content 104 may include, for example, subtitles, closed captioning, audio description(s), and/or additional dialogue (e.g., dialogue in a different language, etc.) associated with the content item 101. In an embodiment, entity and description analysis and/or the like may be used to process/analyze the textual content 104 and determine/identify written/textual descriptions of objects, actions, scenes, events, and/or the like associated with the content item 101, such as written descriptions of what may be seen/viewed and/or interpreted during playback of the content item 101. Entity and description analysis and/or the like may be performed by the textual content analysis unit 110 on each portion of the textual content to determine a distribution of textual elements (e.g., objects, actions, scenes, events, etc.) associated with the plurality of portions of the textual content 104. The textual content 104 may include plain text describing one or more elements (e.g., objects, actions, scenes, events, etc.) associated with one or more portions of the plurality of portions of the textual content 104. The textual content analysis unit 110 may locate and classify words and/or named entities, such as words and/or named entities associated with and/or indicative of the one or more elements (e.g., objects, actions, scenes, events, etc.) mentioned in the plain text of the textual content 104 into pre-defined categories and/or descriptive labels, such as objects (e.g., a car, a train, ocean, etc.), actions/scenes (e.g., characters arguing, characters fighting, characters eating, etc.), sound events (e.g., a siren, sea waves, a dog barking, etc.), and/or the like.

The textual content analysis unit 110 may include a natural language processing (NLP) module 111. The NLP module 111 may receive/extract text from the textual content 104. The NLP module 111 may use machine learning to locate and/or identify text within the textual content 104. The textual content analysis unit 110 may include a knowledge analysis module 112 that may analyze text of the textual content 104 and perform text summarization, sentiment analysis, topic extraction, named entity recognition, parts-of-speech tagging, relationship extraction, and/or the like to determine topics contained within text. The topics may be used to determine specific text/words. For example, text may be determined to be associated with a written description of an object, action scene, and/or the like. The knowledge analysis module 112 may determine one or more words within text determined to be associated with a written description of an object, action scene, and/or the like. The one or more words may be compared to one or more stored elements (e.g., stored indications/descriptions/labels of objects, actions, scenes, events, etc.), such as one or more stored elements in a database 113 to determine candidate elements that include indications, descriptions, and/or labels of objects, actions, scenes, events, and/or the like from an array (corpus) of candidate elements.

The textual content analysis unit 110 may include a disambiguation module 114 that determines which candidate element is the most likely element referenced/indicated for any portion of the textual content 104. The textual content analysis unit 110 (disambiguation module 114) may determine a distribution of textual elements (e.g., objects, actions, scenes, events, etc.) associated with the plurality of portions of the textual content 104. As an example, a distribution of textual elements 115 depicts elements (e.g., indications/descriptions/labels of objects, actions, scenes, events, etc.) determined for portions of the plurality of portions of the textual content 104 where a first portion is associated with a written description of an object identified as (and/or a scene described to depict/include) a "siren", a second portion is associated with a written description of an object identified as (and/or a scene described to depict/include) "fire", and a third portion is associated with a written description of an object identified as (and/or a scene described to depict/include) a "dog".

Auditory event detection/analysis (e.g., acoustic concept indexing, etc.) and/or the like may be used to determine/identify auditory events (e.g., specific sounds, etc.) associated with (occurring within) the content item 101, such as one or more auditory events that may be heard during playback of the content item 101. Auditory event detection/analysis and/or the like may be performed by the auditory event detection unit 130 on each portion of the audio content 102 to determine a distribution of auditory events associated with the plurality of portions of the audio content 102. The auditory event detection unit 130 may include a sound detection interface 131. The sound detection interface 131 may receive the audio content 102.

Sound detection interface 131 may extract features from the audio content 102 (or audio content associated with a different content item). Features may be extracted from the audio content 102 (or audio content associated with a different content item) at regular time intervals (e.g., based on the timecoded portions of the content item 101, etc.). The features may be indications/representations of auditory events, such as changes in sound, pitch, tone, audio signal level, and/or the like occurring with the audio content 102. The features may be determined based on audio data headers included/associated with the audio content 102.

The features may be determined by processing the audio content 102 in the frequency domain instead of the temporal domain via Mel-frequency cepstral coefficients (MFCCs) features and/or the like. The features may be determined by any means/method. The features may be labeled with appropriate filter information (e.g., music, speech/dialogue, footsteps, siren, breathing, clapping, crying, etc.) to create one or more labeled data sets. The one or more labeled data sets may be used to train a deep neural network module 132 to detect auditory events (e.g., specific sounds, etc.), such as speech/dialogue, footsteps, siren, breathing, clapping, crying, and/or the like, in each portion of the audio content 102.

A trained deep neural network module 132 may include a sequence of multiple subnetworks arranged from a lowest subnetwork in the sequence to a highest subnetwork in the sequence. The deep neural network module 132 may perform the same and/or similar processes on each portion of the audio content 102 through each of the subnetworks in the sequence to generate an alternative representation of the audio content 102. The subnetworks in the sequence may include multiple module/layered subnetworks and/or one or more subnetworks that each consist of one or more neural network layers, such as max-pooling layers, convolutional layers, fully-connected layers, regularization layers, and/or the like. A module/layered subnetwork may include a pass-through convolutional layer, one or more groups of neural network layers, and a concatenation layer. Each group of neural network layers in the module/layered subnetwork may include two or more neural network layers in sequence. The concatenation layer may receive an output generated by a pass-through convolutional layer and a respective output generated by each of the one or more groups of neural network layers. The concatenation layer may concatenate the received outputs to produce a single output that is provided as the output of the module/layered subnetwork. Each node in a fully-connected layer may receive an input from each node in the next lowest layer in the sequence and produces an activation from the received inputs in accordance with a set of weights for the node. The activations generated by each node of a fully-connected layer may be provided as an input to each node in the next highest fully-connected layer in the sequence and/or provided to an output module 133.

Based on the alternative representation of the audio content 102 (e.g., a concatenated output from a subnetwork, etc.) the output module 133 (e.g., an output layer, a softmax layer, a rectified linear unit (ReLU), etc.) may generate/produce an output for associated with each portion of the audio content 102, such as a distribution of auditory events 134 associated with the plurality of portions of the audio content 102. As an example, the distribution of auditory events 134 may include sounds determined for portions of the plurality of portions of the audio content 102 where a first portion is associated with a determined sound of a "siren," a second portion is associated with a determined sound of a "fire," and a third portion is associated with a determined sound of an "ocean."

The auditory event detection unit 130 may also perform speech analysis/processing (e.g., voice activity detection (VAD), natural language processing, etc.) on each portion of the plurality of portions of the audio content 102. The auditory event detection unit 130 may also perform speech analysis/processing (e.g., voice activity detection (VAD), natural language processing, etc.) on each portion of the plurality of portions of the audio content 102 to determine portions of the plurality of portions of the audio content 102 that may include speech/dialogue. The auditory event detection unit 130 may determine an audio level (e.g., perceived loudness, etc.) of any speech/dialogue included with the plurality of portions of the audio content 102. The auditory event detection unit 130 may determine the audio level of any speech/dialogue included with the plurality of portions of the audio content 102 in relation to any auditory event of the distribution of auditory events 134.

The system 100 may include a correlation unit 140. The correlation unit 140 may determine correlations between a distribution of media elements, such as the distribution of visual elements 124 and/or the distribution of textual elements 115, and one or more auditory events, such as auditory events stored in an auditory event repository 150. For example, the correlation unit 140 may receive the distribution of visual elements 124 and compare elements of the distribution of visual elements 124 to stored/predefined auditory events described and/or include in an auditory event repository 150.

In some embodiments, the correlation unit 140 may combine distributions of elements from different media contents of a content item (e.g., the distribution of visual elements 124, the distribution of textual elements 115, etc.) to generate a combined distribution of media elements. For example, the distribution of visual elements 124 may be combined, based on the timecode, with elements of the distribution of textual elements 115 to form a combined distribution of media elements 125. The correlation unit 140 may, when generating the combined distribution of media elements 125, remove duplicate elements, such as elements indicated within multiple distributions of elements for the same portion (timecoded portion) of the content item 101. For example, the combined distribution of media elements 125 may include both a "police car" label/description and a "siren" label/description in a first portion of the combined distribution of media elements 125 that corresponds to a first timecoded portion of the content item 101 based on the corresponding first portions of the distribution of visual elements 124 and the distribution of textual elements 115, respectively. The combined distribution of media elements 125 may include a "fire" label/description in the second portion of the combined distribution of media elements 125 that corresponds to a second timecoded portion of the content item 101 based on the duplicated label/description of "fire" corresponding to the second portions of the distribution of visual elements 124 and the distribution of textual elements 115. The combined distribution of media elements 125 may include both a "radio" label/description and a "dog" label/description in a third portion of the combined distribution of media elements 125 that corresponds to a third timecoded portion of the content item 101 based on the corresponding third portions of the distribution of visual elements 124 and the distribution of textual elements 115, respectively.

The auditory event repository 150 may store any number/quantity of auditory events (e.g., stored as raw waveforms, sound clips, audio files, etc.) and/or descriptions of auditory events (e.g., labeled auditory events, etc.).

FIG. 2 shows a table 200 of example auditory events/labels that may be used to determine candidate auditory events. The table 200 lists auditory events/labels of various classifications/categories that may be stored by the auditory event repository 150. For example, column 201 lists auditory events/labels classified/categorized as animal sounds, column 202 lists auditory events/labels classified/categorized as natural soundscapes & water sounds, column 203 lists auditory events/labels classified/categorized as human sounds (non-speech), column 204 lists auditory events/labels classified/categorized as interior/domestic sounds, and column 205 lists auditory events/labels classified/categorized as exterior/urban sounds. The auditory event repository 150 may include auditory events that may be associated with any classification and/or category.

Returning to FIG. 1, the correlation unit 140 may determine correlations between a distribution of media elements (e.g., the distribution of visual elements 124, the distribution of textual elements 115, the combined distribution of media elements 125, etc.) and one or more auditory events/labels within the auditory event repository 150. The correlation unit 140 may use, for example, word embedding, ontology learning, syntax analysis, natural language processing, and/or any method to determine correlations between elements of a distribution of media elements and one or more auditory events/labels within the auditory event repository 150.

To determine correlations between a distribution of media elements and one or more auditory events/labels within the auditory event repository 150, the correlation unit 140 may determine lexical similarities between the written descriptions (text) of the media elements of the distribution of media elements and the one or more auditory events/labels within the auditory event repository 150. For example, the correlation unit 140 may determine that a visual element "fire" from the distribution of visual elements 124 is lexically the same as (e.g., the same word/spelling, etc.) as an auditory event/label "fire" within the auditory event repository 150. The correlation unit 140 may determine that because the visual element "fire" from the distribution of visual elements 124 is lexically the same as (e.g., the same word/spelling, etc.) as an auditory event/label "fire" within the auditory event repository 150, that the visual element "fire" is a candidate auditory event.

The correlation unit 140 may determine that the written description (text) of a media element of a distribution of media elements and one or more auditory events/labels within the auditory event repository 150 do not share a lexical relationship, such as a similar and/or the same spelling. To determine correlations between a distribution of media elements and one or more auditory events/labels within the auditory event repository 150, when the written descriptions (text) of media elements of the distribution of media elements and the one or more auditory events/labels within the auditory event repository 150 do not share a lexical relationship, the correlation unit 140 may include, be associated with, and/or communicate with a data repository, such as a thesaurus, ontology, lexical database, and/or the like. The correlation unit 140 may access the data repository to determine/identify and synonyms for written descriptions (text) of media elements of a distribution of media elements, one or more words (text) that share a semantic relationship with the written descriptions (text) of media elements, and/or the like. The correlation unit 140 may then determine whether one or more synonyms for a written description (text) of a media element, and/or one or more words (text) that share a semantic relationship with the written description (text) of the media element, correspond to one or more auditory events/labels within the auditory event repository 150. The correlation unit 140 may evaluate the correlations between written descriptions (text) of media elements (and/or any synonyms and/or semantically related words) and one or more auditory events/labels within the auditory event repository 150 to determine candidate auditory events.

FIG. 3 shows a table 300 that illustrates correlations between a distribution of media elements (e.g., the distribution of visual elements 124, the distribution of textual elements 115, the combined distribution of media elements 125, etc.) and one or more auditory events/labels within the auditory event repository 150. Media elements (and/or any synonyms and/or semantically related words to the media elements) and auditory events/labels within the auditory event repository 150 that satisfy a correlation threshold indicate a candidate auditory event. Media elements of a distribution of media elements (e.g., the distribution of visual elements 124, the distribution of textual elements 115, the combined distribution of media elements 125, etc.) that satisfy a correlation (similarity) threshold may indicate that an auditory event should be associated with the corresponding portion of the content item. For example, an element of a distribution of media elements (e.g., the distribution of visual elements 124, the distribution of textual elements 115, the combined distribution of media elements 125, etc.) may indicate (via a textual description and/or label, etc.) that a first portion of the content item 101, timecoded at the 5-second mark of the content item 101, is associated with an image of a "police car" and/or a textual description of a "siren" (based respectively on the distribution of visual elements 124 and the distribution of textual elements 115). The correlation unit 140 may determine a correlation value between the "police car" image (and/or the "siren" textual/audio description) and a "siren" auditory events/labels within the auditory event repository 150. A correlation value of 1 between the "police car" image and the "siren" auditory events/labels may be determined because an image/scene of a moving police car may be associated (highly correlated) with a "siren" auditory event/label. A correlation value of 1 between the "textual description of a "siren" and the "siren" auditory events/labels may be determined because the textual description of a "siren" may be associated (highly correlated) with a "siren" auditory event/label. The correlation unit 140 may determine the highest correlation value between elements determined for a portion of the content item 101 and one or more auditory events/labels within the auditory event repository 150. The highest correlation value between elements determined for the portion of the content item 101 may be compared to a correlation threshold. A correlation threshold value may be any value, such as 0.5. The correlation values of 1 for the first portion of the content item 101 may both satisfy the correlation threshold value of 0.5. Correlation values that satisfy a correlation threshold may indicate a candidate auditory event (e.g., a labeled auditory event that may or may not be present in the audio content, etc.) for the respective portion of the content item 101. Similarly, an element of the distribution of media elements (e.g., the distribution of visual elements 124, the distribution of textual elements 115, the combined distribution of media elements 125, etc.) may indicate (via a textual description and/or label, etc.) that a second portion of the content item 101, timecoded at the 3780-second mark of the content item 101, is associated with an image of "fire" and/or a textual description of "fire" (based respectively on the distribution of visual elements 124 and the distribution of textual elements 115). The correlation unit 140 may determine a correlation value between the "fire" image (and/or the "fire" textual/audio description) with a "fire" auditory events/labels within the auditory event repository 150. A correlation value of 1 may be determined because an image/scene of a fire may be associated (highly correlated) with a "fire" auditory event/label, and/or a textual/audio description of a "fire" may be associated (highly correlated) with the "fire" auditory event/label. An element of the distribution of media elements (e.g., the distribution of visual elements 124, the distribution of textual elements 115, the combined distribution of media elements 125, etc.) may indicate (via a textual description and/or label, etc.) that a third portion of the content item 101, timecoded at the 4800-second mark of the content item 101, is associated with an image of a "radio" and/or a textual description of an "ocean" (based respectively on the distribution of visual elements 124 and the distribution of textual elements 115). The correlation unit 140 may determine a correlation value between the "radio" image (and/or the "dog" textual/audio description) with an "ocean" auditory events/labels within the auditory event repository 150. A correlation value of 0.4 may be determined because an image/scene of a radio may be minimally associated (slightly correlated) with an "ocean" auditory event/label, and/or a correlation value of 0.3 may be determined because a textual/audio description of a "dog" may be minimally associated (slightly correlated) with the "ocean" auditory event/label. The highest correlation value between elements determined for the third portion of the content item 101 may be compared to the correlation threshold. The correlation values of 0.4 and 0.3 for the third portion of the content item 101 may both fail to satisfy the correlation threshold value of 0.5. Correlation values that fail to satisfy a correlation threshold may indicate that a candidate auditory event is not associated with the respective portion of the content item 101 and that the audio content for the respective portion of the content item 101 does not need to be modified/augmented.

Returning to FIG. 1, the correlation unit 140 may determine candidate auditory events (e.g., labeled auditory events, etc.) and obtain a sound (e.g., a raw waveform, a sound clip, an audio file, etc.) of and/or associated with the candidate auditory event from the auditory event repository 150. The auditory event repository 150 may store any number/quantity of auditory event labels, and/or auditory events/sounds (e.g., raw waveforms, sound clips, audio files, etc.). The auditory events/sounds (e.g., raw waveforms, sound clips, audio files, etc.) may be obtained from the auditory event repository 150 to form a distribution of candidate auditory events 126 associated with the content item 101.

The system 100 may include an audio augmentation unit 160. The audio augmentation unit 160 may receive the distribution of candidate auditory events 126 associated with the content item 101 and compare the distribution of candidate auditory events 126 to the distribution of auditory events 134.

The audio augmentation unit 160 may determine lexical similarities between the written descriptions (text) of the candidate auditory events 126 and the distribution of auditory events 134 to determine whether candidate auditory events of the distribution of candidate auditory events 126 have corresponding auditory events within the distribution of candidate auditory events 126. For example, the candidate auditory event/label "siren" within the distribution of candidate auditory events 126 may be lexically similar to the auditory event/label "siren" within the distribution of auditory events 134.

The audio augmentation unit 160 may determine that the written description (text) of candidate auditory events of the candidate auditory events 126 and the written description (text) of auditory events of the distribution of auditory events 134 do not share a lexical relationship, such as a similar and/or the same spelling. The audio augmentation unit 160 may include, be associated with, and/or communicate with a data repository, such as a thesaurus, ontology, lexical database, and/or the like. The audio augmentation unit 160 may access the data repository when comparing the distribution of candidate auditory events 126 to the distribution of auditory events 134. The audio augmentation unit 160 may access the data repository to determine/identify synonyms for written descriptions (text) of candidate auditory events of the candidate auditory events 126 and/or the written description (text) of auditory events of the distribution of auditory events 134. The audio augmentation unit 160 may access the data repository to determine/identify one or more words (text) that share a semantic relationship with the written descriptions (text) of candidate auditory events of the candidate auditory events 126 and/or the written description (text) of auditory events of the distribution of auditory events 134. The audio augmentation unit 160 may then determine whether one or more synonyms for a written description (text) of a candidate auditory event of the candidate auditory events 126, and/or one or more words (text) that share a semantic relationship with the written description (text) of the candidate auditory event, correspond to a written description (text) of auditory events of the distribution of auditory events 134, or vice versa. Accordingly, the audio augmentation unit 160 may determine whether candidate auditory events of the distribution of candidate auditory events 126 have corresponding auditory events within the distribution of candidate auditory events 126. The audio augmentation unit 160 may utilize any method and/or technology to determine similarities between the written descriptions (text) of the candidate auditory events 126 and the distribution of auditory events 134, and to determine whether candidate auditory events of the distribution of candidate auditory events 126 have corresponding auditory events within the distribution of candidate auditory events 126. The audio augmentation unit 160, based on comparing the distribution of candidate auditory events 126 to the distribution of auditory events 134, may augment/enhance the audio content 102.

The audio content 102 may be modified to include one or more additional auditory events, such as auditory events indicated by the distribution of candidate auditory events 126 associated with the content item 101 that are not included with the distribution of auditory events 134.

Based on the comparison the audio content 102 may be augmented/enhanced to increase an audio level of one or more auditory events indicated by the distribution of auditory events 134.

For example, waveform 161 is a raw waveform of a "siren" sound occurring in the first portion of the audio content 102. The distribution of candidate auditory events 126 may also indicate that a "siren" sound (auditory event) should be associated with a first portion of the content item 101 that corresponds to the first portions of the textual content 104, the visual content 103, and the audio content 102. The audio augmentation unit 160 may determine that an audio level (e.g., perceived loudness, etc.) of the siren" sound (auditory event) of the first portion of the audio content 102 is low (e.g., does not satisfy an audio level threshold, amplitude, etc.). The augmentation unit 160 may use a sound (e.g., raw waveform, sound clip, an audio file, etc.) from an auditory event repository 150 (indicated by the distribution of candidate auditory events 126) to augment/enhance the audio level of the waveform 161. Waveform 162 is a raw waveform of a "siren" sound occurring in the first portion of the audio content 102 for which the associated audio level (amplitude, etc.) has been increased.

The audio augmentation unit 160 may, based on the audio level of any speech/dialogue included with the plurality of portions of the audio content 102 determined by the auditory event detection unit 130, modify (e.g., decrease, increase, etc.) the audio level of any speech/dialogue included with the plurality of portions of the audio content 102 in relation to an audio level associated with any auditory event, such as an auditory event of the distribution of auditory events 134.

Figure 4:
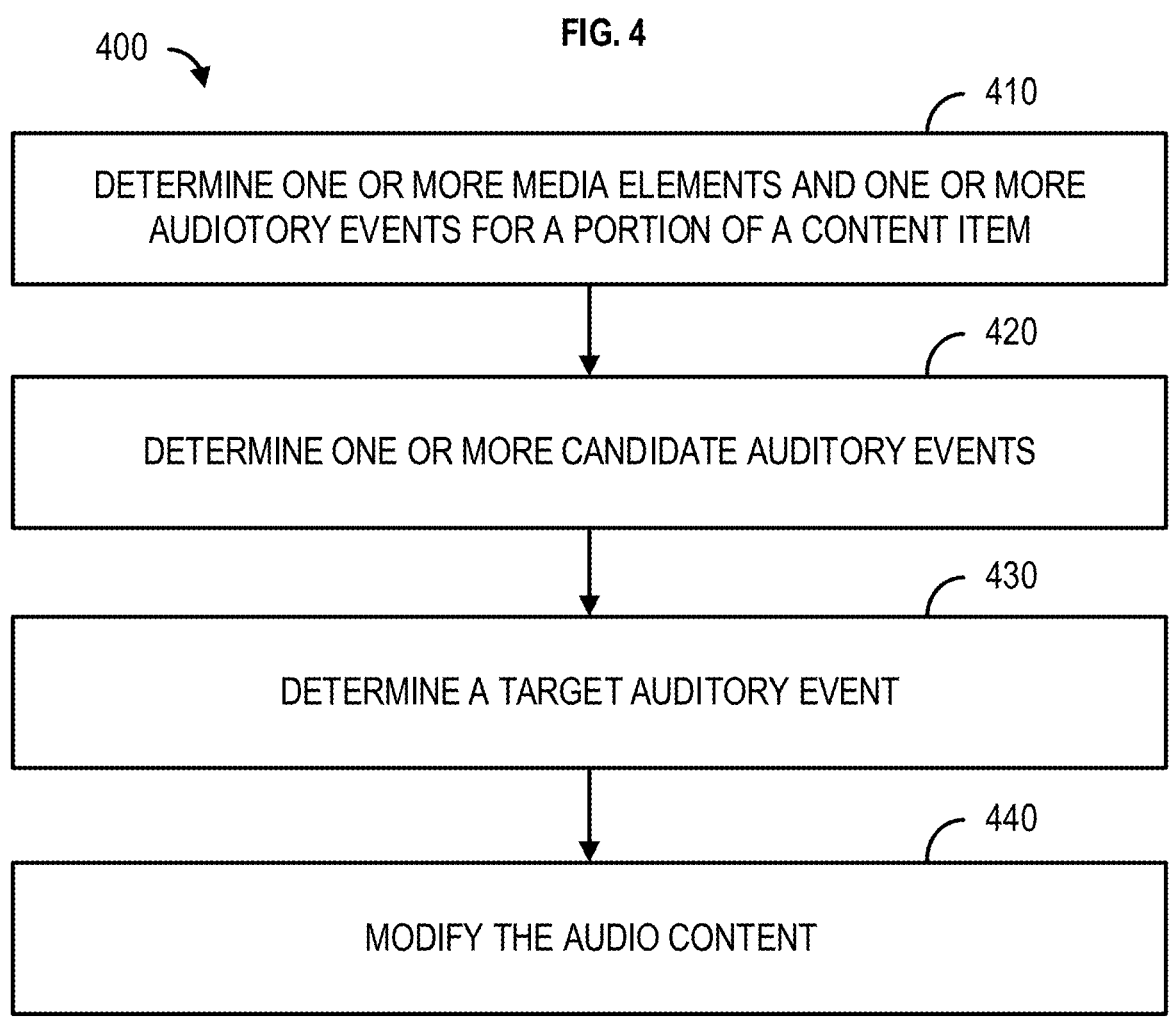
FIG. 4 shows a flowchart of an example method for augmenting audio content.

FIG. 4 shows a flowchart of a method 400 for augmenting audio content. At 410, one or more media elements (e.g., visual elements, textual elements, a distribution of media elements, combined media elements, etc.) of a content item (e.g., multimedia content, a movie, streaming content, etc.) and one or more auditory events (e.g., a distribution of auditory events, etc.) of the content item may be determined. For example, audio content and content from any other media of the content item (e.g., visual content, textual content, etc.) may be determined for each portion of a plurality of portions of the content item.

The content item may be separated into media components, such as the audio content (e.g., one or more audio files, etc.), video content (e.g., a video file, etc.), textual content (e.g., one or more text files, etc.), and/or the like. The content may be separated into media components (e.g., audio, video, text, etc.) by any method/means and in any format. Each portion of the plurality of portions of the content item may be timecoded. The audio content and other media content, such as the video content and/or the textual content, for each portion of the plurality of portions of the content item, may correspond to each other based on timecode.

The audio content may include any music, dialogue, sound, auditory waveform, and/or the like associated with the content item. The audio content may include one or more auditory events that provide context to specific scenes and/or events depicted by the content item and/or aid subjective perception (e.g., what is seen, heard, interpreted, etc.) of the content item. An auditory event may include a sound, a plurality of sounds, a sound effect, a voice, music, and/or the like. Any sound included with the audio content may be an auditory event. For example, the content item may depict a boat on the ocean (an ocean scene) and the audio content may include sounds of the boat moving (e.g., engine noises, horns, etc.). The audio content may include an auditory event (one or more auditory events) that provides context to one or more portions (e.g., scenes, frames, etc.) of the plurality of portions of the content item, such as a sound of ocean waves, and/or the like that provide context to the ocean scene. For example, an audio file of the content item may be associated with one or more audio data headers that indicate auditory events for the one or more portions of the content item, such as the sound of ocean waves, and/or the like.

Machine learning, a trained deep neural network, and/or the like may determine one or more auditory events, such as sounds of music, speech/dialogue, footsteps, sirens, breathing, clapping, a crying baby, and/or the like, associated with each portion of a plurality of portions of the audio content. For example, speech/music/audio recognition methods and/or the like may be used to determine auditory events the one or more auditory events associated with the plurality of portions of the audio content.

The one or more auditory events audio may be determined based on audio data headers included with the audio content (content item). For example, the audio content for each portion of the plurality of portions of the content item may include the respective audio data header of a plurality of audio data headers. An audio data header may indicate an auditory event (e.g., a specific sound, etc.) for a portion of the plurality of portions of the content item.

Media elements (e.g., described objects, actions, scenes, events, etc.) of the content item (e.g., multimedia content, a movie, streaming content, etc.) may be used to generate one or more media elements for a portion of the content item. For example, the one or more media elements for the portion of the content item may include one or more elements determined from the visual content 103 and/or one or more elements determined from the textual content 104.

The one or more visual elements may be based on the video content. For example, the video content of the content item may include depicted scenes, objects, and/or events associated with and/or depicted by the content item. Machine learning, a trained deep neural network, and/or the like may determine, based on each portion (e.g., frame, segment, etc.) of the video content, one or more elements (e.g., objects, actions, scenes, events, etc.) associated with each portion of a plurality of portions of the video content. For example, object/visual recognition methods and the like may be used to determine visual concepts, such as depicted objects, actions, scenes, events, and/or the like to determine, generate, and/or identify the one or more video elements.

The one or more textual elements (e.g., described objects, actions, scenes, events, etc.) may be based on the textual content. The textual content may include audio descriptive data, closed captioning information, and/or the like. Entity analysis, machine learning, a trained neural network, and/or the like may determine, based on each portion of the textual content, one or more elements associated with the plurality of portions of the textual content. For example, audio description data associated with the content may be analyzed and semantic words, such as words that describe objects, actions, scenes, events, and/or the like may be determined, identified, and/or extracted. The words that describe objects, actions, scenes, events, and/or the like may be the one or more elements.

The one or more visual elements may be combined, based on the timecode, with the one or more textual elements to form the one or more media elements for any portion of the content item. Elements indicated within the one or more visual elements and the one or more textual elements for the same portion (timecoded portion) of the content item may both be included with the one or more media elements for the respective portion of the content item. For example, a visual element of the one or more visual elements associated with a first portion of the content item may a "police car" label/description and a textual element of the one or more textual elements associated with the first portion of the content item may be a "siren" label/description. The one or more media elements may include both the "police car" label/description and the "siren" label/description associated with the first portion of content item. Duplicate elements, such as elements indicated within the one or more visual elements and the one or more textual elements for the same portion (timecoded portion) of the content item may be removed.

At 420, one or more candidate auditory events may be determined. The one or more candidate auditory events may be determined based on the one or more media elements of the content item. The one or more media elements may indicate the one or more candidate auditory events. For example, a media element may be determined to be a sound of a police siren, and based on the media element, a candidate auditory event may be determined to be a sound of a police siren. A media element may be determined to be a textual description of the sound of a police siren, and based on the media element, a candidate auditory event may be determined to be a sound of a police siren. Any media element may indicate a candidate auditory event.

The one or more candidate auditory events may be determined, for example, based on correlations between the one or more media elements of the content item and an auditory event repository. For example, the one or more media elements may be determined to be associated with one or more auditory events in the auditory event repository, and based on the one or more media elements being associated with the one or more auditory events in the auditory event repository, the one or more candidate auditory events may be determined.

The one or more media elements of the content item may be compared to stored/predefined auditory events within the auditory event repository. The auditory event repository may store any number/quantity of auditory events/labels/sounds (e.g., raw waveforms, sound clips, audio files, etc.). Word embedding, ontology learning, syntax analysis, natural language processing, and/or any other correlation method may be used to determine elements of the one or more media elements of the portion of the content item that satisfy a correlation (similarity) threshold between one or more auditory events/labels/sounds within the auditory event repository. The one or more candidate auditory events may be determined based on correlations between elements of the one or more media elements of a portion of the content item and one or more auditory events/labels/sounds within the auditory event repository that satisfy the correlation (similarity) threshold. For example, correlations between elements of the one or more media elements of a portion of the content item and one or more auditory events/labels/sounds within the auditory event repository that satisfy the correlation (similarity) threshold may indicate that an auditory event should be associated with the corresponding portion of the content item.

Correlations between elements of the one or more media elements of a portion of the content item and one or more auditory events/labels/sounds within the auditory event repository that do not satisfy the correlation (similarity) threshold may indicate that a candidate auditory event is not associated with the respective portion of the content item and/or that the audio content for the respective portion of the content item does not need to be modified/augmented.

At 430, a target auditory event in audio content associated with the portion of the content item may be determined. The target auditory event may include a candidate auditory event of the one or more candidate auditory events that are missing from the one or more of auditory events. For example, each auditory event included with the audio content may be compared, based on the timecode, to a candidate auditory event of the one or more candidate auditory events to determine an auditory event that is missing from the one or more auditory events.

The target auditory event may include an attenuated auditory event, an accentuated auditory event, an unintelligible auditory event, and/or the like of the one or more auditory events. For example, sound (audio) analysis and/or the like may be performed on an audio file associated with the audio content to determine an attenuated auditory event, an accentuated auditory event, an unintelligible auditory event, and/or the like of the one or more auditory events.

At 440, the audio content may be modified. The audio content may be modified based on the target auditory event. Modifying the audio content may include modifying the audio content to include the target auditory event. For example, a sound (e.g., raw waveform, sound clip, an audio file, etc.) of and/or associated with the candidate auditory event determined to be missing from the one or more auditory events may be obtained, for example, from the auditory event repository. An audio file associated with the audio content may be modified/augmented to include the sound (e.g., raw waveform, sound clip, an audio file, etc.) of the candidate auditory event determined to be missing from the one or more auditory events.

An audio signal level (e.g., perceived loudness, amplitude level, decibel level, etc.) may be determined for each auditory event of the one or more auditory events that corresponds to candidate auditory event of the candidate auditory events. An audio signal threshold may be determined in relation to music, speech/dialogue, and/or any other sound and/or auditory component for each portion of the plurality of portions of the content item. For example, the audio signal threshold may indicate an audio signal level required for an auditory event to be perceived (e.g., heard, etc.) in relation to the music, speech/dialogue, and/or any other sound and/or auditory component for a portion of the plurality of portions of the content item. Auditory events that do not satisfy the audio level threshold may be attenuated audio signals and may be unable to be perceived (e.g., heard, etc.) in relation to the music, speech/dialogue, and/or any other sound and/or auditory component for the respective portion of the plurality of portions of the content item. Auditory events that exceed the audio level threshold may be accentuated audio signals and prevent, mitigate, and/or the like perception of other auditory events and/or audio content, such as music, speech/dialogue, and/or any other sound and/or auditory component for the respective portion of the plurality of portions of the content item. Modifying the audio content may include increasing an audio level associated with the attenuated auditory event based on the audio level threshold. Modifying the audio content may include decreasing an audio level associated with the accentuated auditory event based on the audio level threshold.

Modifying the audio content may include determining audio data (e.g., raw waveforms, sound clips, audio files, etc.) associated with the unintelligible auditory event and using the audio data to update the audio file associated with the audio content. For example, a portion of the audio file, such as a portion of the audio file associated with the unintelligible auditory event, may be modified to include the audio data (e.g., raw waveforms, sound clips, audio files, etc.) associated with the unintelligible auditory event.

Figure 5:
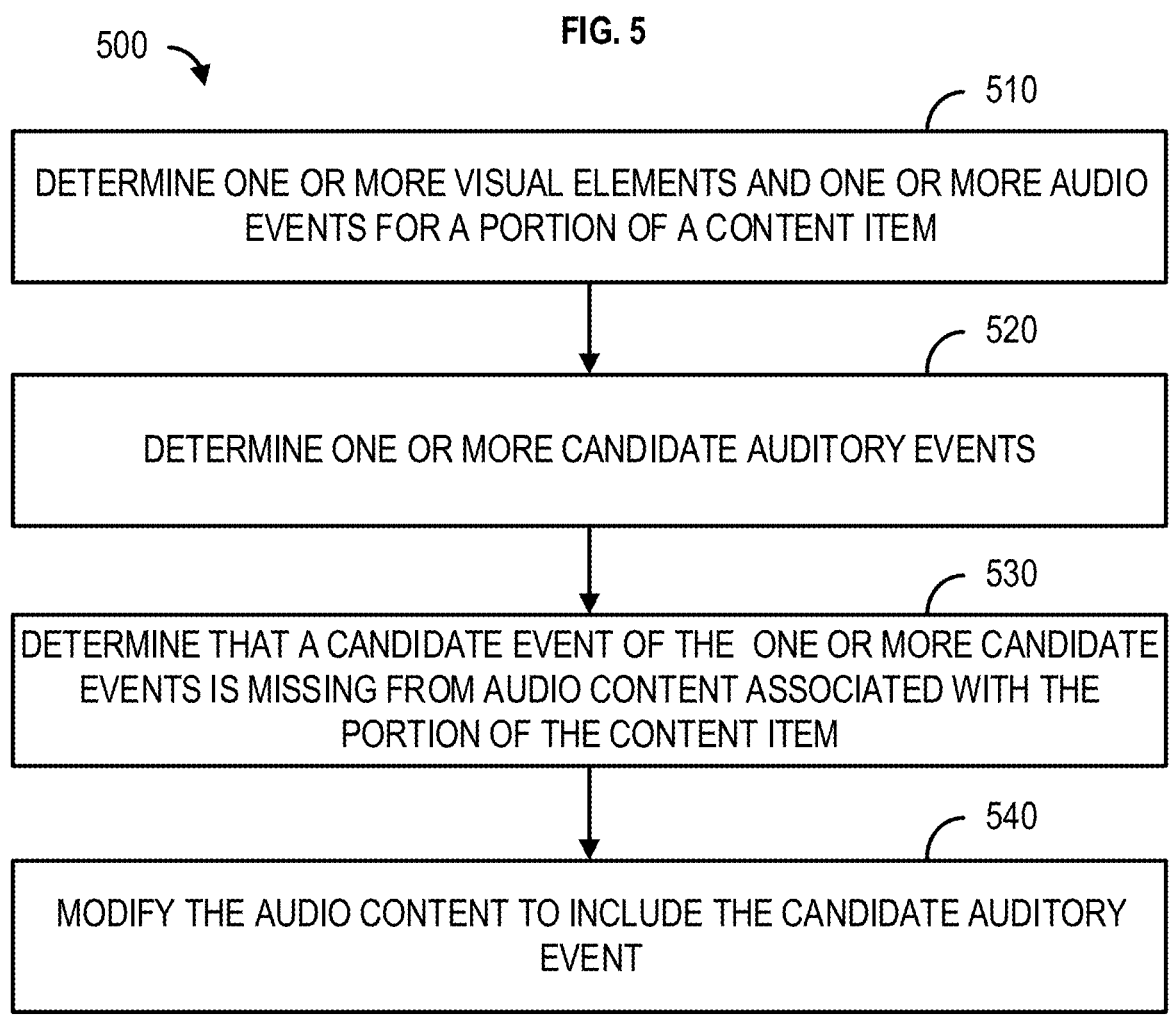
FIG. 5 shows a flowchart of an example method for augmenting audio content.

FIG. 5 shows a flowchart of a method 500 for augmenting audio content. At 510, one or more visual elements, and one or more auditory events for a portion of a content item may be determined. In an embodiment, one or more visual elements, one or more textual elements, and one or more auditory events for a portion of a content item may be determined. To determine the one or more visual elements (and/or the one or more textual elements), and the one or more auditory events, the content item may be separated into media contents of the content item, such as the audio content (e.g., an audio file, etc.), video content (e.g., a video file, etc.), textual content (e.g., a text file, etc.), and/or the like. The content may be separated into media contents of the content item (e.g., audio content, video content, textual content, etc.) by any method/means and in any format. Each portion of the plurality of portions of the content item may be timecoded. The audio content, the video content, and/or the textual content, for each portion of the plurality of portions of the content item, may correspond to each other based on timecode.

The audio content may include any music, dialogue, sound, auditory waveform, and/or the like associated with the content item. The audio content may include one or more auditory events that provide context to specific scenes and/or events depicted by the content item and/or aid subjective perception (e.g., what is seen, heard, interpreted, etc.) of the content item. An auditory event may include a sound, a plurality of sounds, a sound effect, a voice, music, and/or the like. Any sound included with the audio content may be an auditory event. For example, the content item may depict a boat on the ocean (an ocean scene) and the audio content may include sounds of the boat moving (e.g., engine noises, horns, etc.). The audio content may include an auditory event (one or more auditory events) that provides context to one or more portions (e.g., scenes, frames, etc.) of the plurality of portions of the content item, such as a sound of ocean waves, and/or the like that provide context to the ocean scene. For example, an audio file of the content item may be associated with one or more audio data headers that indicate auditory events for the one or more portions of the content item, such as the sound of ocean waves, and/or the like.

The one or more visual elements may be based on the video content. For example, the video content of the content item may include depicted scenes, objects, and/or events associated with and/or depicted by the content item. Machine learning, a trained deep neural network, and/or the like may determine, based on each portion (e.g., frame, segment, etc.) of the video content, one or more elements (e.g., objects, actions, scenes, events, etc.) associated with each portion of a plurality of portions of the video content. For example, object/visual recognition methods and the like may be used to determine visual concepts, such as depicted objects, actions, scenes, events, and/or the like to determine, generate, and/or identify the one or more video elements.

The one or more textual elements may be based on the textual content. The textual content may include audio descriptive data, closed captioning information, and/or the like. Entity analysis, machine learning, a trained neural network, and/or the like may determine, based on each portion of the textual content, one or more textual elements associated with the plurality of portions of the textual content. For example, audio description data associated with the content may be analyzed and semantic words, such as words that describe objects, actions, scenes, events, and/or the like may be determined, identified, and/or extracted. The words that describe objects, actions, scenes, events, and/or the like may be used to determine, generate, and/or identify the one or more textual elements.

The one or more visual elements may be combined, based on the timecode, with the one or more textual elements to generate a distribution of media elements for any portion of the content item. Elements indicated within the one or more visual elements and the one or more textual elements for the same portion (timecoded portion) of the content item may both be included with a distribution of media elements. For example, a visual element of the one or more visual elements associated with a first portion of the content item may a "police car" label/description and a textual element of the one or more textual elements associated with the first portion of the content item may be a "siren" label/description. The distribution of media elements may include both the "police car" label/description and the "siren" label/description associated with the first portion of the content item. Duplicate elements, such as elements indicated within the one or more visual elements and the one or more textual elements for the same portion (timecoded portion) of the content item may be removed from the distribution of media elements.

At 520, one or more candidate auditory events may be determined. The one or more candidate auditory events may be determined based on the one or more media elements of the content item. The one or more media elements may indicate the one or more candidate auditory events. For example, a media element may be determined to be a sound of a police siren, and based on the media element, a candidate auditory event may be determined to be a sound of a police siren. A media element may be determined to be a textual description of the sound of a police siren, and based on the media element, a candidate auditory event may be determined to be a sound of a police siren. Any media element may indicate a candidate auditory event.

The one or more candidate auditory events may be determined, for example, based on correlations between the distribution of media elements (e.g., the one or more visual elements and/or the one or more textual elements) and an auditory event repository. For example, one or more elements of distribution of the distribution of media elements may be determined to be associated with one or more auditory events in the auditory event repository, and based on the one or more media elements being associated with the one or more auditory events in the auditory event repository, the one or more candidate auditory events may be determined.

For example, the distribution of media elements may be compared to stored/predefined auditory events within the auditory event repository. The auditory event repository may store any number/quantity of auditory events/labels/sounds (e.g., raw waveforms, sound clips, audio files, etc.). Word embedding, ontology learning, syntax analysis, natural language processing, and/or any other correlation method may be used to determine elements of the distribution of media elements that satisfy a correlation (similarity) threshold between one or more auditory events/labels/sounds within the auditory event repository. The one or more candidate auditory events may be determined based on correlations between elements of the distribution of media elements for the portion of the content item and one or more auditory events/labels/sounds within the auditory event repository that satisfy the correlation (similarity) threshold. For example, correlations between elements of the distribution of media elements for the portion of the content item and one or more auditory events/labels/sounds within the auditory event repository that satisfy the correlation (similarity) threshold may indicate that an auditory event should be associated with the corresponding portion of the content item. Correlations between elements of the distribution of media elements for the portion of the content item and one or more auditory events/labels/sounds within the auditory event repository do not satisfy the correlation (similarity) threshold may indicate that a candidate auditory event is not associated with the portion of the content item and/or that the audio content for the portion of the content item does not need to be modified/augmented.

At 530, a candidate auditory event of the one or more candidate auditory events may be determined to be missing from the audio content associated with the portion of the content item. For example, each auditory event included with the audio content may be compared, based on the timecode, to a candidate auditory event of the one or more candidate auditory events to determine an auditory event that is missing from the one or more auditory events.

At 540, the audio content may be modified. The audio content may be modified to include the candidate auditory event. For example, a sound (e.g., a raw waveform, a sound clip, an audio file, etc.) of and/or associated with the candidate auditory event determined to be missing from the one or more auditory events may be obtained, for example, from the auditory event repository. An audio file associated with the audio content may be modified/augmented to include the sound (e.g., a raw waveform, a sound clip, an audio file, etc.) of the candidate auditory event determined to be missing from the one or more auditory events.

Figure 6:
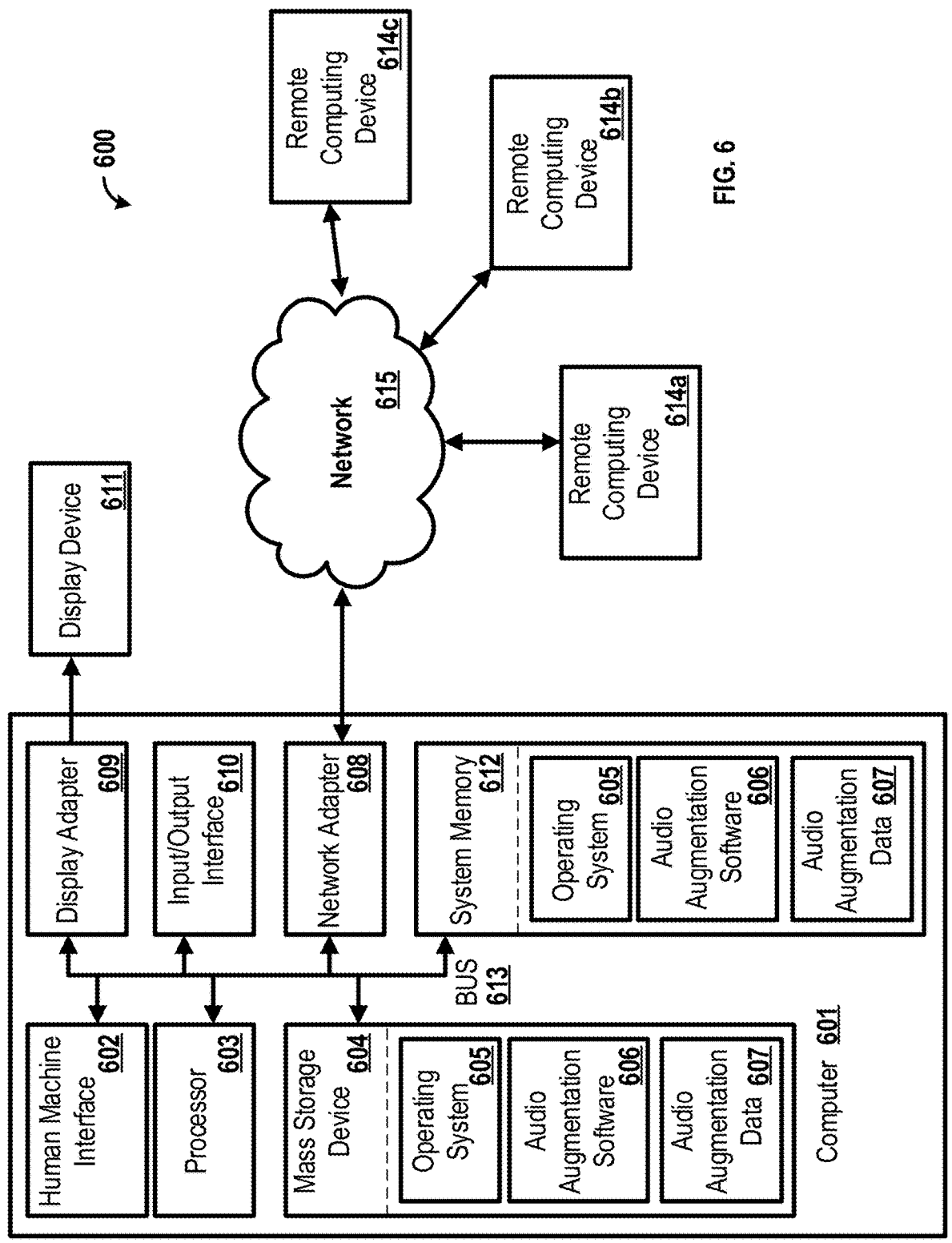
FIG. 6 shows a block diagram of an example computing device for implementing augmentation of audio content.

FIG. 6 shows a system 600 for augmenting audio content. Any device, component, unit, and/or the like may be a computer 601 as shown in FIG. 6.

The computer 601 may comprise one or more processors 603, a system memory 612, and a bus 613 that couples various components of the computer 601 including the one or more processors 603 to the system memory 612. In the case of multiple processors 603, the computer 601 may utilize parallel computing.

The bus 613 may comprise one or more of several possible types of bus structures, such as a memory bus, memory controller, a peripheral bus, an accelerated graphics port, and a processor or local bus using any of a variety of bus architectures.

The computer 601 may operate on and/or comprise a variety of computer-readable media (e.g., non-transitory). Computer-readable media may be any available media that is accessible by the computer 601 and comprises, non-transitory, volatile and/or non-volatile media, removable and non-removable media. The system memory 612 has computer-readable media in the form of volatile memory, such as random access memory (RAM), and/or non-volatile memory, such as read-only memory (ROM). The system memory 612 may store data such as audio augmentation data 607 and/or program modules such as operating system 605 and audio augmentation software 606 that are accessible to and/or are operated on by the one or more processors 603.

The computer 601 may also comprise other removable/non-removable, volatile/non-volatile computer storage media. The mass storage device 604 may provide non-volatile storage of computer code, computer-readable instructions, data structures, program modules, and other data for the computer 601. The mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 604. An operating system 605 and audio augmentation software 606 may be stored on the mass storage device 604. One or more of the operating system 605 and audio augmentation software 606 (or some combination thereof) may comprise program modules and the audio augmentation software 606. Audio augmentation data 607 may also be stored on the mass storage device 604. Audio augmentation data 607 may be stored in any of one or more databases known in the art. The databases may be centralized or distributed across multiple locations within the network 615.

A user may enter commands and information into the computer 601 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 603 via a human-machine interface 602 that is coupled to the bus 613, but may also be connected by other interface and bus structures, such as a parallel port, game port, an IEEE 1394 Port (also known as a Firewire port), a serial port, network adapter 608, and/or a universal serial bus (USB).

A display device 611 may also be connected to the bus 613 via an interface, such as a display adapter 609. It is contemplated that the computer 601 may have more than one display adapter 609 and the computer 601 may have more than one display device 611. A display device 611 may be a monitor, an LCD (Liquid Crystal Display), light-emitting diode (LED) display, television, smart lens, smart glass, and/or a projector. In addition to the display device 611, other output peripheral devices may comprise components such as speakers (not shown) and a printer (not shown) which may be connected to the computer 601 via Input/Output Interface 610. Any step and/or result of the methods may be output (or caused to be output) in any form to an output device. Such output may be any form of visual representation, including, but not limited to, textual, graphical, animation, audio, tactile, and the like. The display 611 and computer 601 may be part of one device, or separate devices.

The computer 601 may operate in a networked environment using logical connections to one or more remote computing devices 614*a,b,c*. A remote computing device 614*a,b,c* may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 601 and a remote computing device 614*a,b,c* may be made via a network 615, such as a local area network (LAN) and/or a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components may reside at various times in different storage components of the computing device 601, and are executed by the one or more processors 603 of the computer 601. An implementation of audio augmentation software 606 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
    determining, for a portion of a content item, one or more textual elements and one or more auditory events;
    determining, based on the one or more textual elements, one or more candidate auditory events;
    determining, based on the one or more auditory events and the one or more candidate auditory events, a target auditory event in audio content associated with the portion of the content item; and
    modifying, based on the target auditory event, the audio content.

2. The method of claim 1, further comprising determining the one or more textual elements based on one or more of natural language processing, optical character recognition, or an output from a machine learning model.

3. The method of claim 1, further comprising determining the one or more auditory events based on one or more of audio signal analysis, speech recognition, or an output from a machine learning model.

4. The method of claim 1, wherein modifying the audio content comprises modifying the audio content to include the target auditory event.

5. The method of claim 1, wherein modifying the audio content comprises:
   determining audio data associated with the target auditory event; and
   updating, based on the audio data, a waveform associated with the audio content.

6. The method of claim 1, wherein determining the one or more candidate auditory events comprises:
   determining that the one or more textual elements are associated with one or more auditory events in an auditory event repository; and
   determining, based on the one or more textual elements being associated with the one or more auditory events in the auditory event repository, the one or more candidate auditory events.

7. The method of claim 1, wherein the target auditory event comprises a candidate auditory event of the one or more candidate auditory events that is missing from the one or more auditory events.

8. The method of claim 1, wherein the target auditory event comprises an attenuated auditory event of the one or more auditory events or an accentuated auditory event of the one or more auditory events, wherein modifying the audio content comprises increasing an audio level associated with the attenuated auditory event or decreasing an audio level associated with the accentuated auditory event.

9. The method of claim 1, wherein the target auditory event comprises an unintelligible auditory event of the one or more auditory events, wherein modifying the audio content comprises:
   determining an audio file associated with the unintelligible auditory event; and
   updating, based on the audio file, a waveform associated with the audio content.

10. A method comprising:
    determining, for a portion of a content item, one or more media elements, wherein the portion of the content item comprises audio content;
    determining, based on the one or more media elements being associated with one or more auditory events in an auditory event repository, one or more candidate auditory events; and
    modifying, based on the one or more candidate auditory events, one or more portions of the audio content corresponding to the one or more candidate auditory events.

11. The method of claim 10, wherein the one or more media elements comprise one or more textual elements, and further comprising determining the one or more media elements based on one or more of natural language processing, optical character recognition, or an output from a machine learning model.

12. The method of claim 10, wherein the one or more media elements comprises one or more visual elements, and further comprising determining the one or more media elements based on one or more of object recognition, or an output from a machine learning model.

13. The method of claim 10, wherein determining the one or more candidate auditory events comprises:
    determining that the one or more media elements are associated with the one or more auditory events in the auditory event repository; and
    determining, based on the one or more media elements being associated with the one or more auditory events in the auditory event repository, the one or more candidate auditory events.

14. The method of claim 10, wherein modifying, based on the one or more candidate auditory events, the audio content comprises:
    determining, based on the one or more candidate auditory events, a target auditory event in the audio content; and
    modifying, based on the target auditory event, the audio content.

15. The method of claim 14, wherein modifying the audio content comprises modifying the audio content to include the target auditory event.

16. The method of claim 14, wherein modifying the audio content comprises:
    determining audio data associated with the target auditory event; and
    updating, based on the audio data, a waveform associated with the audio content.

17. The method of claim 10, further comprising determining, for the portion of the content item, the one or more auditory events, and wherein modifying, based on the one or more candidate auditory events, the audio content comprises:
    determining, based on the one or more auditory events and the one or more candidate auditory events, a target auditory event in the audio content; and
    modifying, based on the target auditory event, the audio content.

18. An apparatus comprising:
    one or more processors; and
    a memory storing processor-executable instructions that, when executed by the one or more processors, cause the apparatus to:
      determine, for a portion of a content item, one or more textual elements and one or more auditory events;
      determine, based on the one or more textual elements, one or more candidate auditory events;
      determine, based on the one or more auditory events and the one or more candidate auditory events, a target auditory event in audio content associated with the portion of the content item; and
      modify, based on the target auditory event, the audio content.

19. The apparatus of claim 18, wherein the processor-executable instructions, when executed by the one or more processors, further cause the apparatus to determine the one or more textual elements based on one or more of natural language processing, optical character recognition, or an output from a machine learning model.

20. The apparatus of claim 18, wherein the processor-executable instructions, when executed by the one or more processors, further cause the apparatus to determine the one or more auditory events based on one or more of audio signal analysis, speech recognition, or an output from a machine learning model.

21. The apparatus of claim 18, wherein the processor-executable instructions that, when executed by the one or more processors, cause the apparatus to modify the audio content, further cause the apparatus to modify the audio content to include the target auditory event.

22. The apparatus of claim 18, wherein the processor-executable instructions that, when executed by the one or more processors, cause the apparatus to modify the audio content, further cause the apparatus to:

determine audio data associated with the target auditory event; and update, based on the audio data, a waveform associated with the audio content.

23. The apparatus of claim 18, wherein the processor-executable instructions that, when executed by the one or more processors, cause the apparatus to determine the one or more candidate auditory events, further cause the apparatus to:

determine that the one or more textual elements are associated with one or more auditory events in an auditory event repository; and determine, based on the one or more textual elements being associated with the one or more auditory events in the auditory event repository, the one or more candidate auditory events.

24. The apparatus of claim 18, wherein the target auditory event comprises a candidate auditory event of the one or more candidate auditory events that is missing from the one or more auditory events.

25. The apparatus of claim 18, wherein the target auditory event comprises an attenuated auditory event of the one or more auditory events or an accentuated auditory event of the one or more auditory events, wherein the processor-executable instructions that, when executed by the one or more processors, cause the apparatus to modify the audio content, further cause the apparatus to increase an audio level associated with the attenuated auditory event or decrease an audio level associated with the accentuated auditory event.

26. The apparatus of claim 18, wherein the target auditory event comprises an unintelligible auditory event of the one or more auditory events, wherein the processor-executable instructions that, when executed by the one or more processors, cause the apparatus to modify the audio content, further cause the apparatus to:

determine an audio file associated with the unintelligible auditory event; and update, based on the audio file, a waveform associated with the audio content.

27. An apparatus comprising:
one or more processors; and
a memory storing processor-executable instructions that, when executed by the one or more processors, cause the apparatus to:

determine, for a portion of a content item, one or more media elements, wherein the portion of the content item comprises audio content;

determine, based on the one or more media elements being associated with one or more auditory events in an auditory event repository, one or more candidate auditory events; and modify, based on the one or more candidate auditory events, one or more portions of the audio content corresponding to the one or more candidate auditory events.

28. The apparatus of claim 27, wherein the one or more media elements comprises one or more textual elements, and wherein the processor-executable instructions, when executed by the one or more processors, further cause the apparatus to determine the one or more media elements based on one or more of natural language processing, optical character recognition, or an output from a machine learning model.

29. The apparatus of claim 27, wherein the one or more media elements comprises one or more visual elements, and wherein the processor-executable instructions, when executed by the one or more processors, further cause the apparatus to determine the one or more media elements based on one or more of object recognition, or an output from a machine learning model.

30. The apparatus of claim 27, wherein the processor-executable instructions that, when executed by the one or more processors, cause the apparatus to determine the one or more candidate auditory events, further cause the apparatus to:

determine that the one or more media elements are associated with the one or more auditory events in the auditory event repository; and determine, based on the one or more media elements being associated with the one or more auditory events in the auditory event repository, the one or more candidate auditory events.

31. The apparatus of claim 27, wherein the processor-executable instructions that, when executed by the one or more processors, cause the apparatus to modify, based on the one or more candidate auditory events, the audio content, further cause the apparatus to:

determine, based on the one or more candidate auditory events, a target auditory event in the audio content; and modify, based on the target auditory event, the audio content.

32. The apparatus of claim 31, wherein the processor-executable instructions that, when executed by the one or more processors, cause the apparatus to modify the audio content, further cause the apparatus to modify the audio content to include the target auditory event.

33. The apparatus of claim 31, wherein the processor-executable instructions that, when executed by the one or more processors, cause the apparatus to modify the audio content, further cause the apparatus to:

determine audio data associated with the target auditory event; and update, based on the audio data, a waveform associated with the audio content.

34. The apparatus of claim 27, wherein the processor-executable instructions, when executed by the one or more processors, further cause the apparatus to determine, for the portion of the content item, the one or more auditory events, and wherein the processor-executable instructions that, when executed by the one or more processors, cause the apparatus to modify, based on the one or more candidate auditory events, the audio content, further cause the apparatus to:

determine, based on the one or more auditory events and the one or more candidate auditory events, a target auditory event in the audio content; and modify, based on the target auditory event, the audio content.

* * * * *